United States Patent
Amirijoo et al.

(10) Patent No.: US 9,265,065 B2
(45) Date of Patent: Feb. 16, 2016

(54) METHOD AND ARRANGEMENT IN A COMMUNICATION NETWORK

(75) Inventors: Mehdi Amirijoo, Linkoping (SE); Filip Andren, Vienna (AT); Fredrik Gunnarsson, Linkoping (SE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 51 days.

(21) Appl. No.: 13/704,555

(22) PCT Filed: Jun. 14, 2010

(86) PCT No.: PCT/SE2010/050660
§ 371 (c)(1),
(2), (4) Date: Dec. 14, 2012

(87) PCT Pub. No.: WO2011/159207
PCT Pub. Date: Dec. 22, 2011

(65) Prior Publication Data
US 2013/0089079 A1    Apr. 11, 2013

(51) Int. Cl.
| | | |
|---|---|---|
| H04W 74/00 | (2009.01) | |
| H04W 72/14 | (2009.01) | |
| H04L 1/20 | (2006.01) | |
| H04W 52/50 | (2009.01) | |
| H04W 52/14 | (2009.01) | |
| H04W 74/08 | (2009.01) | |

(52) U.S. Cl.
CPC ............... H04W 72/14 (2013.01); H04L 1/20 (2013.01); H04W 52/50 (2013.01); H04W 74/008 (2013.01); H04W 52/146 (2013.01); H04W 74/0833 (2013.01)

(58) Field of Classification Search
CPC ... H04W 74/00; H04W 74/04; H04W 74/008; H04W 74/08; H04W 74/0833
See application file for complete search history.

(56) References Cited

U.S. PATENT DOCUMENTS

2008/0043771 A1* 2/2008 Cho et al. .................. 370/431

FOREIGN PATENT DOCUMENTS

| EP | 1 170 919 A1 | 1/2002 |
| EP | 1 986 343 A2 | 10/2008 |
| WO | 2010002303 A1 | 1/2010 |

OTHER PUBLICATIONS

Filip Andren, "Optimization of Random Access in 3G Long Term Evolution," 25 Sep. 2009, Linkoping University.*
Ilip Andren, "Optimization of Random Access in 3G Long Term Evolution," 25 Sep. 2009, Linkoping University.*
(Continued)

*Primary Examiner* — Jae Y Lee
(74) *Attorney, Agent, or Firm* — Patent Portfolio Builders, PLLC (57) ABSTRACT

A method, in a base station, provide a mechanism for observing random access performance in a Long Term Evolution network. The random access performance is defined by an access delay. The access delay is a delay from the initial random access attempt until access is granted. The method comprises receiving a respective report from a plurality of user equipment, where each of the respective user equipment has performed a random access process and received a random access grant. The reactive report includes access delay related random access information. The method includes determining a respective access delay, based on each of the access delay related random access information. The determined access delays are used for the estimation of access delay statistics. The random access performance is observed based on the access delay statistics.

21 Claims, 4 Drawing Sheets

(56) References Cited

OTHER PUBLICATIONS

Amirijoo et al. "On Self-Optimization of the Random Access Procedure in 3G Long Term Evolution," Jun. 5, 2009, IEEE.*
3GPP TR 36.902 v1.2.0 (May 2009).*
Amirijoo, M. et al: 'Towards Random Access Channel Self-Tuning in LTE Vehicular Technology Conference, 2009, Apr. 26-29, 2009, pp. 1-5.
Shikha Srivastava et al.: 'Analysis of UMTS radio channel access delay' Computer Communications vol. 31, No. 10, Jun. 25, 2008, ISSN 0140-3664, pp. 1877-1889.
Qualcomm Europe: 'Framework for Rach Parameter Optimization' 3GPP TSG RAN WG3 R3-090697, Mar. 23-26, 2009, Seoul, Korea.
Qualcomm Europe: 'Framework for UE SON Repors'3GPP TSG RAN WG3 & SA WG5 Jan. 12-13, 2008, Sophia Antipolis, France, S5-090017.
Extended European Search Report dated Jun. 11, 2015, issued in European Patent Application No. 10853318.3, 11 pages.
Ericsson et al. "UE Measurement Support for the RACH Optimization Function" 3GPP TSG RAN WG2 Meeting #66bis, R2-093801, 2009, 4 pages.
3GPP, 3rd Generation Partnership Project; Technical Specification Group Radio Access Network; Evolved Universal Terrestrial Radio Access Network (E-UTRAN); Self-configuring and self-optimizing network (SON) use cases and solutions (Release 9), 3GPP TR 36.902 V9.1.0, 2010, 22 pages.

* cited by examiner

METHOD AND ARRANGEMENT IN A COMMUNICATION NETWORK

CROSS REFERENCE TO RELATED APPLICATION(S)

This application is a 35 U.S.C. §371 National Phase Entry Application from PCT/SE2010/050660, filed Jun. 14, 2010, designating the United States, the disclosure of which is incorporated herein in its entirety by reference.

TECHNICAL FIELD

The present invention relates to a method in a base station and a base station. In particular it relates to observation of a random access channel performance by estimating access delay.

BACKGROUND

In a typical cellular radio system, also referred to as a wireless communication system, User Equipments (UE)s, also known as mobile terminals and/or wireless terminals communicate via a Radio Access Network (RAN) to one or more core networks. The user equipments may be mobile stations or user equipment units such as mobile telephones also known as "cellular" telephones, and laptops with wireless capability, e.g., mobile termination, and thus may be, for example, portable, pocket, hand-held, computer-included, or car-mounted mobile devices which communicate voice and/or data with the radio access network.

The radio access network covers a geographical area which is divided into cell areas, with each cell area being served by a base station, which in some networks is referred to as "eNB", "NodeB" or "B node" and which in this document is referred to as a base station. A cell is a geographical area where radio coverage is provided by the radio base station equipment at a base station site. The base stations communicate over the air interface operating on radio frequencies with the user equipment units within range of the base stations.

Random Access Procedure in Long Term Evolution (LTE)

During initial access, a user equipment seeks access to the core network in order to register and commence services. A random access (RA) serves as an UpLink (UL) control procedure to enable the user equipment to access the core network. Since the initial access attempt cannot be scheduled by the core network, the random access procedure is by definition contention based. Collisions may occur and an appropriate contention-resolution scheme needs to be implemented. Comprising user data on the contention-based uplink is not spectrally efficient due to the need for guard periods and retransmissions. Therefore, there is a separation of the transmission of the random access burst, which is a preamble whose purpose is to obtain uplink synchronization, from the transmission of user data.

The random access procedure in long term evolution serves two main purposes:

It lets the user equipment align its uplink timing to that expected by a base station in order to minimize interfering with other user equipments transmissions. Uplink time alignment is a requirement in Evolved Universal Terrestrial Radio Access Network (E-UTRAN) before data transmissions can commence.

It provides a means for the user equipment to notify the core network of its presence and enables the base station to give the user equipment initial access to the system.

In addition to the usage during initial access, the random access will also be used when the user equipment has lost the uplink synchronization or when the user equipment is in an idle or a low-power mode.

The basic random access procedure is a four-phase procedure.

Phase 1 comprise transmission of a random access preamble, allowing the base station to estimate the transmission timing of the user equipment. Uplink synchronization is necessary as the user equipment otherwise cannot transmit any uplink data.

Phase 2 comprise the core network transmitting a timing advance command to correct the uplink timing, based on the timing of arrival measurement in the first phase. In addition to establishing uplink synchronization, the second phase also assigns uplink resources and temporary identifier to the user equipment to be used in the third phase in the random access procedure.

Phase 3 comprise signaling from the user equipment to the core network using the UpLink Shared Channel (UL-SCH) similar to normal scheduled data. A primary function of this message is to uniquely identify the user equipment. The exact content of this signaling depends on the state of the user equipment, e.g., whether it is previously known to the core network or not.

Phase 4, the final phase, is responsible for contention resolution in case multiple user equipments tried to access the system on the same resource.

For cases where the core network knows, in advance, that a particular user equipment will perform a random access procedure to acquire uplink synchronization, a contention-free variety of the random access procedure has been agreed. This effectively makes it possible to skip the contention resolution process of Phases 3 and 4 for important cases such as arrival to target cell at Hand Over (HO) and arrival of DownLink (DL) data.

Phase 1—Random Access Preamble

Prior to sending a preamble, the user equipment shall synchronize to the downlink transmissions and read a Broadband Control Channel (BCCH). The broadband control channel will reveal where the random access time slots are located, which frequency bands can be used and which preambles, sequences, are available. At the next random access slot, the user equipment will send the preamble. The preamble sequence implicitly includes a random ID which identifies the user equipment.

If multiple random access frequency bands have been defined, the user equipment randomly selects one of them. The group of sequences allocated to a cell is partitioned into two subgroups. By selecting a preamble sequence from a specific subgroup, the user equipment can give a single-bit indication of its resource requirement and/or link quality. The particular sequence used for the preamble is randomly selected within the desired subgroup. This sequence implicitly contains a random ID which serves as a user equipment identifier.

The base station estimates the uplink timing of the user equipment based on the timing of the received preamble.

Phase 2—Random Access Response

After the preamble transmission, the user equipment waits for a random access response message on a Downlink Shared Channel (DL-SCH), the downlink assignment which is indicated on a L1/L2 control channel which is a Dedicated Physical Control Channel (DPCCH). The random access response message is transmitted semi-synchronously, i.e. within a window, to the reception of the random access preamble in order to allow the scheduler more flexibility. The random access response comprises:

- the same random user equipment identity as present in the preamble;
- a time alignment message to provide the proper uplink timing to the user equipment;
- a temporary Radio Network Temporary Identifier (RNTI) which is unique for the particular random access resource, time, channel and preamble, used in Phase 1. For initial access, the temporary radio network temporary identifier shall be used for Phases 3 and 4;
- an uplink resource grant for transmission on an uplink shared channel in Phase 3.

If no random access response message has been received after a certain time following the preamble transmission, the user equipment shall send a new preamble at the next random access time slot. In some cases the base station may indicate an overload, that too many preambles are detected, and instruct the user equipment to wait for some time before attempting random access again. For the new attempt, the user equipment shall select new, random parameters for the preamble sequence and the non-synchronized random access frequency band. Furthermore, the user equipment will increase the power level of the preamble to obtain a power ramping procedure similar as used in Wideband Code Division Multiple Access (WCDMA).

Phase 3—First Scheduled UL Transmission

In Phase 3, the user equipment provides the core network with a unique identifier in the message it transmits on the uplink shared channel according to the grant contained in the random access response. The type of user equipment identifier, e.g. Cell Radio Network Temporary Identifier (C-RNTI), Temporary Mobile Subscriber Identities (TMSI), International Mobile Subscriber Identity (IMSI) or International Mobile Equipment Identity (IMEI), depends on which extent the user equipment is already known in the core network.

In case of initial access, the message is a Radio Resource Control (RRC) Connection Request message.

In case of non-initial access, i.e. when the user equipment is already RRC_CONNECTED, the user equipment identifier is the cell radio network temporary identifier and is signaled by a Medium Access Control (MAC) layer.

The transmission uses Hybrid Automatic Repeat-reQuest (HARQ).

Phase 4—Contention Resolution

The purpose of the fourth phase is to resolve contention. Note that, from the second step, multiple user equipments performing simultaneously random access attempts using the same preamble listen to the same response message and therefore have the same temporary identifier. Hence, in the fourth phase, the base station echoes the user equipment identity provided by the user equipment in Phase 3. Only a user equipment which finds a match between the identity received in the fourth step and the identity transmitted as part of the third step will declare the random access procedure successful. This user equipment will also transmit a hybrid automatic repeat-request acknowledge in the uplink. For non-initial access, i.e. when the user equipment is already RRC_CONNECTED, the user equipment identity is reflected on the L1/L2 control channel. If the user equipment has not yet been assigned a cell radio network temporary identifier, the temporary identity from the second step is promoted to the cell radio network temporary identifier, otherwise the user equipment keeps its already assigned cell radio network temporary identifier.

User equipments which do not find a match between the identity received in Phase 4 and the respective identity transmitted as part of Phase 3 are considered to have failed the random access procedure and need to restart the random access procedure with Phase 1; selecting new random parameters for the preamble sequence. No hybrid automatic repeat-request feedback is transmitted from these user equipments.

Contention-Free Random Access Procedure

For cases where the core network knows, in advance, that a particular user equipment will perform a random access procedure to acquire uplink synchronization, a dedicated preamble is reserved and assigned to the user equipment under consideration. Dedicated Preamble assignment for hand over is handled by radio resource control whereas preamble assignment for downlink data arrival is handled by medium access control. When the user equipment transmits the dedicated preamble in Phase 1, the core network knows to which user equipment this preamble was assigned and can already at the time of detection of this preamble determine the identity of the user equipment. Thus no contention resolution is needed and the delay before data transmission can be resumed is reduced.

Random Access Back-Off Procedure

For the event of Random Access overload, a Random Access Back-Off procedure is supported. This procedure prevents immediate new random access attempts which would only worsen a collision situation.

In case of an overload, the base station signals through the random access response message a back-off indicator $T_B$. The user equipment that does not receive a random access response message that includes the transmitted preamble will wait a time which is uniformly distributed between 0 and $T_B$ before attempting random access gain.

Random Access Channel Physical Resource

A single random access opportunity comprises a time slot and a fixed bandwidth. The random access time slot length $T_{RA}$ shall accommodate the preamble sent by the user equipment and the required guard period (GP) to take into account the unknown uplink timing. The timing misalignment amounts to 6.7 µs/km. Third generation Partnership Project (3GPP) has decided for a minimum $T_{RA}$ of 1 ms. Here the preamble length is then 800 µs plus a cyclic prefix of around 102.5 µs. A guard time of 97.5 µs suffices for cell radii up to 15 km. Larger guard periods and cyclic prefix are needed to accommodate timing uncertainties from cells larger than 15 km. Such large cells may also require longer preambles to increase the received energy. In order to support random access under various cell conditions RAN1 has defined additionally 3 random access preamble formats which require a $T_{RA}$ of 2 ms or even 3 ms. These larger slots are created by the base station by not scheduling traffic in the consecutive subframe(s). Those extended preambles contain repetitions of the 800 µs long part and/or a longer cyclic prefix.

For Time Division Duplex (TDD) an additional "short" random access is defined. The short random access preamble only spans 133 μs. Because of this very short duration the preamble will most likely not contain a cyclic prefix but a technique called overlap-and-add will be used to enable frequency-domain processing. At the time of writing many details regarding applicability and performance of this short random access are still open.

According to Third generation Partnership Project, the bandwidth of a random access opportunity is 1.08 MHz (6 RB). The effective bandwidth utilized by the random access preamble is 1.05 MHz leaving small spectral guard bands on each side. This is necessary since random access and regular uplink data are separated in frequency-domain but are not completely orthogonal.

Preamble Format

Figure 1:
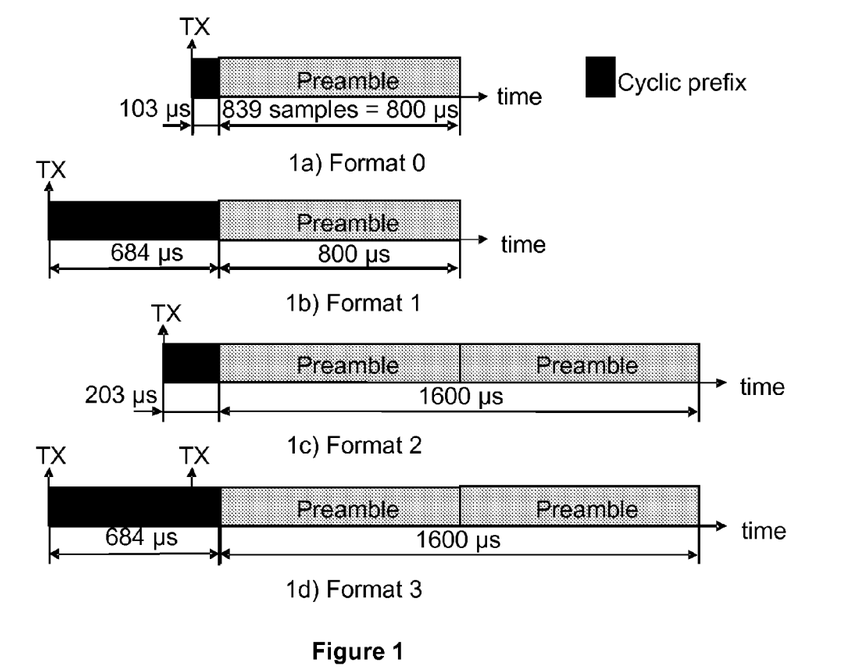
FIG. 1 illustrates random access preambles, prior art.

FIG. 1a shows the detailed timing of the basic random-access preamble. The preamble is prefixed with a cyclic prefix to enable simple frequency domain processing. Its length is in the order of $T_{GP}+T_{DS}=97.5+5$ μs=102.5 μs, where $T_{DS}$ corresponds to the maximum delay spread and $T_{GP}$ corresponds to the maximum round trip time. The cyclic prefix insures that the received signal is always circular, after removing the cyclic prefix in the random access receiver, and thus can be processed by Fast Fourier Transforms. (FFT) Therefore, the "active" random access preamble duration is 1000 μs−2·$T_{GP}$−$T_{DS}$=800 μs. The random access subcarrier spacing is ⅛₀₀ μs=1250 Hz.

FIG. 1b to FIG. 1d show the preamble formats. Format 1, depicted 1b, has an extended cyclic prefix and is suited for cell radii up to approximately 100 km. However, since no repetition occurs this format is only suited for environments with good propagation conditions. Format 2, depicted 1c, contains a repeated main preamble and a cyclic prefix of approximately 200 μs. With a random access opportunity length of 2 ms the remaining guard period is also approximately 200 μs. This format supports cell radii of up to approximately 30 km. Format 3, depicted 1d, also contains a repeated main preamble and an extended cyclic prefix. Using a random access opportunity length of 3 ms this format supports cell radii of up to approximately 100 km. In opposite to format 1, depicted 1b, format 3, depicted 1d, comprises a repeated preamble and is therefore better suited for environments with bad propagation conditions.

Random Access Channel (RACH) Power Control

Power control has been agreed for RACH in long term evolution:

$$P_{RACH}(N)=\min\{P_{MAX}, P_{O\_RACH}+PL+(N-1)\Delta_{RACH}+\Delta_{Preamble}\}$$

Where:
$P_{RACH}$ is the preamble transmit power,
N=1, 2, 3, . . . is the RACH attempt number,
$P_{MAX}$ is the maximum user equipment power,
$P_{O\_RACH}$ is a 4-bit cell specific parameter signaled via broadband control channel with a granularity of 2 dB (difference in maximum and minimum $P_{O\_RACH}$ is 30 dB),
PL is the path loss estimated by the user equipment,
$\Delta_{RACH}$ is the power ramping step signaled via broadband control channel and represented by 2 bits (4 levels) with a granularity of 2 dB, $\Delta_{Preamble}$ is a preamble-based offset (format 0-3), see Section 0.

Note that RACH attempts N=2, 3, 4, . . . includes retransmissions where:
  no random access response message has been received by the user equipment,
  the random access response message is intended for another preamble, user equipment,
  the contention resolution has failed and the user equipment has to try random access again.

In essence, the user equipment will increase its transmission power until network access is granted. There is typically an upper bound on the number of retransmissions and, thus, number of power increases.

Timing Factors

There are three major timing factors that affect the access delay of one attempt. The first timing factor is the time a user equipment waits for a random access response after it has sent its preamble. This timing factor is controlled by the parameter ra-responseWindowsSize, which is broadcasted to the user equipment by the base station. This window starts 2 ms, after preamble is sent and during this window the user equipment waits for a random access response.

The second timing factor is the time a user equipment has to wait after the received random access response until it can send its unique identity. This timing factor is controlled by the base station, which tells the user equipment in the random access response in which sub frame it can send its unique identity. Depending on the load and other factors this timing factor is hard to predict, but according to the unique identity can be sent no sooner than 6 ms after the random access response.

The third factor is the time a user equipment waits for a contention resolution response after it has sent its unique identity and is controlled by the parameter mac-ContentionResolutionTimer, which is broadcasted to the user equipment by the base station. The values of ra-ResponseWindowsSize and mac-ContentionResolutionTimer are seen in Table 1.

TABLE 1

Values of ra-responseWindowsSize and mac-ContentionResolutionTimer.

| Parameter | Time (sub frames) |
|---|---|
| ra-ResponseWindowsSize | 2, 3, 4, 5, 6, 7, 8 and 10 |
| Mac-ContentionResolutionTimer | 8, 16, 24, 32, 40, 48, 56 and 64 |

Preamble Detection

Figure 2:
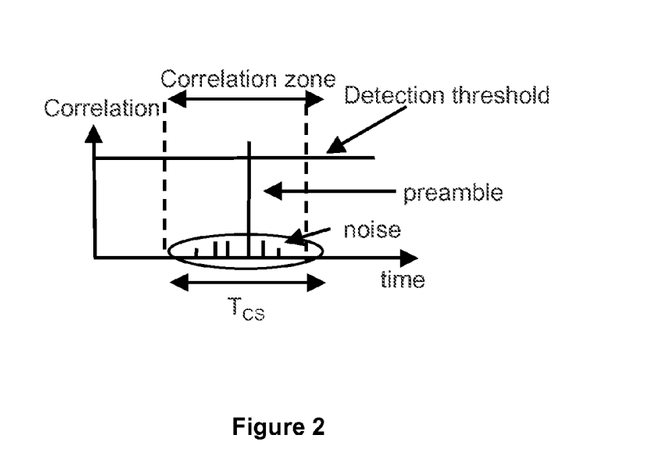
FIG. 2 illustrates peaks generated after correlation, prior art.

A receiver at the base station correlates the received signal with all the root sequences (Zadoff-Chu sequences) allocated to the base station, see FIG. 2.

If the correlation, height of the correlation peak, due to a preamble is higher than the detection threshold, then the preamble is detected. However, if the correlation is lower than the detection threshold then the preamble is not detected. In a latter case this is related to detection miss. The detection miss probability is the probability that the correlation between the root sequence and the received signal is less than the detection threshold when in fact a preamble was sent, i.e., it is a miss detection.

Problems with Existing Solutions

There are several problems with today's approaches for observing the performance of random access:

There is a need to perform extensive simulations and field trials (drive tests), which are very costly, Simulations and as such the predicted random access performance may not be accurate.

SUMMARY

It is an object of the invention to provide a mechanism that observes a random access performance in a Long Term Evolution communication network.

In accordance with a first aspect of the present invention, a method in a base station is provided. The method observes a random access performance in a Long Term Evolution communication network. The random access performance is defined by an access delay, where the access delay is a delay from the initial random access attempt until access is granted. The method comprises receiving a respective report from a plural of user equipments, where each of the respective user equipment has performed a random access process and has received a random access grant. Respective report will comprise access delay related random access information. Further the method comprises determining a respective access delay, which is based on each of the access delay related random access information. The determined access delays will be the basis for the estimation of access delay statistics. Finally will the random access performance be observed based on the access delay statistics.

In accordance with a second aspect of the present invention, an arrangement in a base station is provided. The base station observes a random access performance in a Long Term Evolution communication network. The random access performance is definable by an access delay, where the access delay is a delay from the initial random access attempt until access is granted. The arrangement comprises a receiver that is configured to receive a respective report from a plural of user equipments, where each of the respective user equipment has been adapted to perform a random access process and has been adapted to receive a random access grant. Respective report will comprise access delay related random access information. Further the arrangement comprises a determining unit which is configured to determine a respective access delay based on each of the access delay related random access information. The determined access delays will be the basis when a estimating unit estimate access delay statistics. An observing unit, configured to observe, will observe the random access performance based on the access delay statistics.

An advantage with the invention is that the methods presented are based on feedback information and, as such, up to date estimates may be derived.

Another advantage with the invention is that prediction tools suing radio propagation models based on, for example, topology, are not need, since the invention relies on the feedback information from the user equipments.

BRIEF DESCRIPTION OF THE DRAWINGS

The invention is described in more detail with reference to attached drawings illustrating exemplary embodiments of the invention and in which.

DETAILED DESCRIPTION

Briefly described the present solution provides a method where the parameters of a Long Term Evolution (LTE) random access is observed based on observations of a random access channel performance by estimating an access delay also to be referred to as AD. The performance is more specifically defined in terms of access delay, which is the delay from which a user equipment starts to perform a random access until access is granted. The estimation of access delay is facilitated by user equipment reports gathered at the base station. The performance is defined in terms of access delay statistics, which may comprise the distribution, percentiles of access delay.

Figure 3:
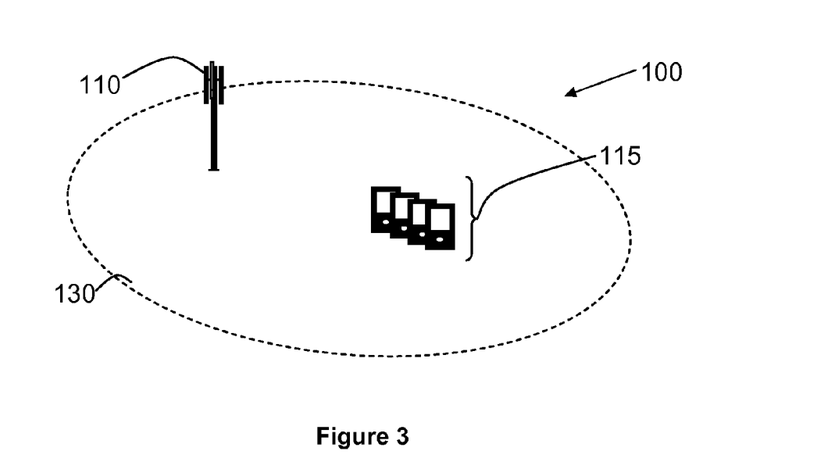
FIG. 3 illustrates a cell with a base station and plural of user equipments.

FIG. 3 depicts an LTE communication system 100, which is also referred to as Evolved-Universal Terrestrial Radio Access Network (E-UTRAN).

The LTE communication system 100 comprises at least one base station 110 serving a cell 130. The base station 110 is a radio base station such as an eNodeB, capable to communicate over a radio carrier with user equipments 115 being present in the cell.

The one or more user equipments 115 being present within the cell 130, are served by the base station 110. There may be several user equipments 115 within the cell 130, but only four are depicted in FIG. 3 for the sake of simplicity. The user equipments 115 may be terminals, e.g. mobile terminals or wireless terminals, mobile phones, computers such as e.g. laptops, Personal Digital Assistants (PDA), or any other radio network units capable to communicate with a base station (110) in LTE communication systems.

The present solution comprises a method in the base station 110 for observing a random access performance. The method will be described with reference to the flow chart depicted in FIG. 4. As mentioned above, the random access performance is definable by an access delay. The access delay is a delay from the initial random access attempt until access is granted.
Step 401
The base station 110 receives from a plural of user equipments 115 a respective report. Each of the respective user equipment 115, has performed a random access process, which comprises sending at least one preamble, and has received a random access grant. The respective report comprises access delay related random access information.
Step 402
The base station 110 determines a respective access delay based on each of the access delay related random access information. This may be determined by detection miss probability also referred to as DMP, contention probability also referred to as CP, and a set of delay penalties $\alpha_0$-$\alpha_4$, as illustrated in FIG. 5.

Respective user equipment report may comprise the number of transmitted preambles by the user equipment 115 and may comprise other entities, for example, whether the user equipment 115 has observed a contention resolution failure or information concerning the user equipment power headroom during random access. The power headroom is the margin to the user equipment maximum output power level.

The detection miss probability is defined as the probability that a preamble sent by a user equipment 115 is not detected by a base station 110. The contention probability is defined as the probability that a user equipment 115 does not get access because of contention.

Figure 5:
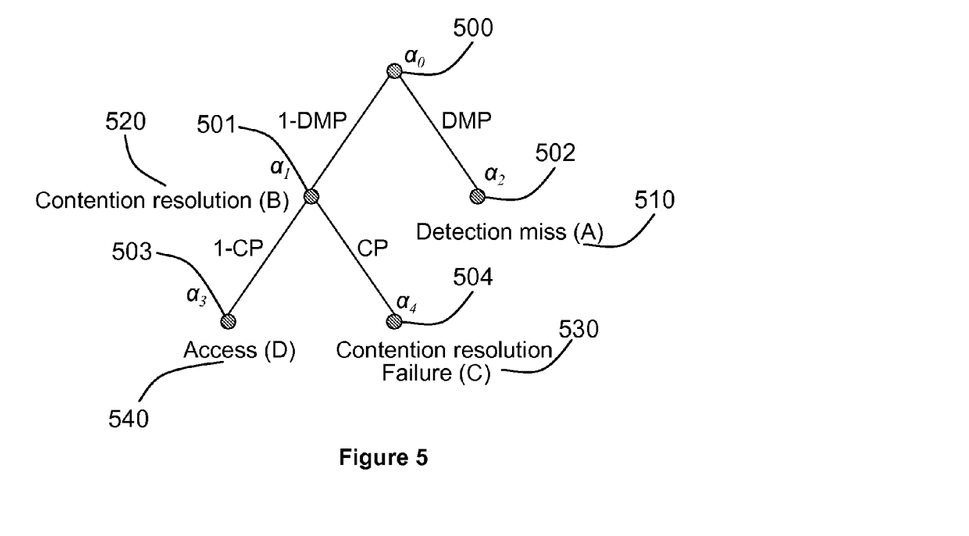

For one access attempt there are three possibilities for one of the user equipment 115 as depicted by the diagram in FIG. 5. The diagram shows the outcome of a random access attempt, starting with the user equipment 115 transmitting a preamble. There are two outcomes of the preamble transmission as described below.

The first outcome of preamble transmission (A) 510 is when the access attempt fails because of detection miss, which may be, when the user equipment's 115 has sent preambles that was not detected by the base station 110.

The second outcome of preamble transmission (B) 520 is when the preamble is detected and given this the user equipment 115 moves to contention resolution, which again has two outcomes.

The first outcome of contention resolution (C) 530 is when the attempt fails because of contention, which may be, when the one of user equipment 115 has chosen the same preamble at another user equipment 115 and looses the contention resolution.

The second outcome of contention resolution (D) 540 is that one of the user equipment 115 gets access.

Each of the outcomes has a time delay penalty associated with it. This means that if a user equipment 115 travels from 500 to 502 in FIG. 5 it will be punished with the delay penalty $\alpha_2$ 502. The parameters $\alpha_c$-$\alpha_4$ are defined as follows and are also exemplified in FIG. 6, which shows how delay penalties impact on the overall access delay (AD).

Figure 6:
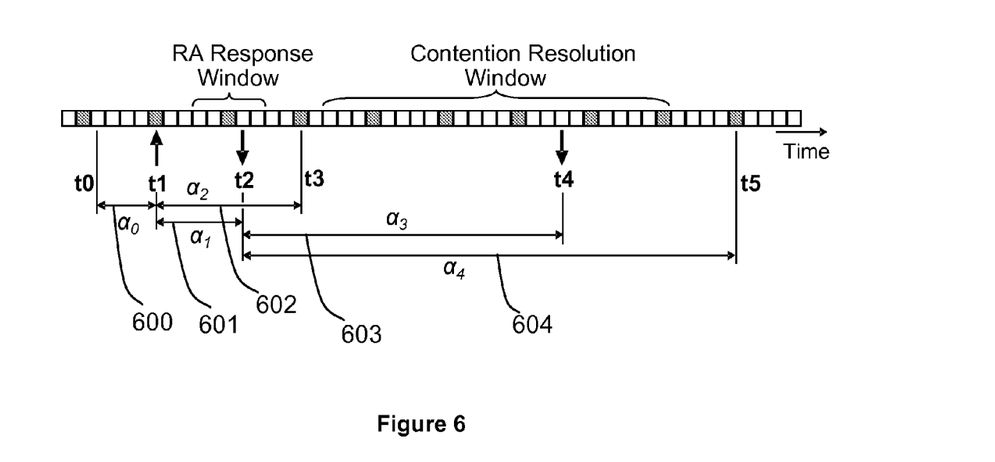
FIG. 6 illustrates how delay penalties impact the overall access delay.

The first attempt delay, denoted as $\alpha_0$ 500, 600, is defined as the time in ms between a user equipment 115 wants to start a random access attempt until the user equipment 115 sends its first preamble.

The detection delay, denoted as $\alpha_1$ 501, 601, is defined as the time in ms from a user equipment 115 sends a preamble until the time the user equipment 115 gets the random access response associated with the preamble.

The detection miss delay, denoted $\alpha_2$ 502, 602, is defined as the time in ms from a user equipment 115 sends a preamble until the time the user equipment 115 sends a new preamble in the next attempt, given that the user equipment 115 did not receive a random access (RA) response.

The random access finished delay, denoted $\alpha_3$ 503, 603, is defined as the time in ms from a user equipment 115 receives its random access response until the user equipment 115 gets an Radio Resource Control (RRC) Connection Setup message containing the unique identity belonging to the user equipment 115. This may be when the user equipment 115 wins the contention resolution procedure. This delay also includes the time required for transmitting the radio resource control connection request message.

The contention resolution failed delay, denoted $\alpha_4$ 504, 604, is defined as the time in ms from when a user equipment 115 receives its random access response until the user equipment 115 sends a preamble in the next attempt, given that the user equipment 115 did not receive a radio resource control connection setup with its unique identity. This may be when the user equipment 115 looses the contention. This delay also includes the time required for transmitting the radio resource control connection request message.

Further depicted by FIG. 6 is that at time t0 the user equipment 115 starts to make a random access. At time t1 the user equipment 115 transmits the preamble. At time t2, the user equipment 115 gets a random access response message. Alternatively, the user equipment 115 does not get a random access response message during the random access response window, and has therefore to transmit a new preamble at time t3. Given that the random access response message was received by the user equipment 115, then the user equipment 115 transmits an radio resource control connection request message (not depicted) together with a unique identity of the user equipment 115. If there is a contention and the user equipment 115 wins the contention resolution procedure, then the user equipment 115 receives an radio resource control connection setup message at time t4, otherwise the user equipment 115 has to wait until the end of the contention resolution window and retransmit a new preamble at time t5.

Referring again to FIG. 5, it is obvious that event A (detection miss) may also be caused by the random access response message not properly decoded. Similarly, event C may be caused by erroneous decoding of radio resource control connection request and radio resource control connection setup messages. The probability of not decoding these messages may be included in the calculations of DMP and CP.

Further, Random Access Channel (RACH) may be configured according to different formats. This means that the length of the random access slots may be 1, 2, or 3 ms. The method for estimating access delay statistics may be extended such that the format of random access channel is taken into account.

In some of the embodiments by using DMP, CP, and time penalties $\alpha_0$-$\alpha_4$ the access delay (AD) may be determined given as follows:

$$AD(n) = \alpha_0 + \alpha_1 + \alpha_3 + (n-1)*(\alpha_2 * P(A|AccessFailed) + (\alpha_1 + \alpha_4) * P(B|AccessFailed))$$

where n is the number of random access attempts i.e., number of preambles transmitted), P(A|AccessFailed) and P(B|AccessFailed) are the conditional probabilities that a user equipment 115 goes down one of the paths A or C given the attempt was unsuccessful. The probabilities P(A|AccessFailed) and P(B|AccessFailed) may be determined using DMP, CP and other factors related to access failure.

The determination of (DMP) may be performed by using the number of transmitted preambles reported by the user equipment 115, which depends on contention and as such on CP, and this bias must be accounted for.

In some of the embodiments the bias introduced by contention is removed by disregarding the user equipment reports where it is indicated that the user equipment 115 lost the contention resolution during the random access.

In other embodiments there may be determination of CP and explicitly remove of the impact of contention from the access delay. Basically, this method is based on the notion of Access Probability (AP);

$$AP_m = 1 - \prod_{i=1}^{m} (DMP_i + (1 - DMP_i) \times CP)$$

defined as the probability that the user equipment 115 is granted access after attempt m.

An example of this is given in Table 2.

TABLE 2

The access probability for each attempt number.

| Attempt Number | Detection Miss Probability (DMP) | Contention Probability (CP) | Access Probability (AP) |
|---|---|---|---|
| 1 | 0.10 | 0.01 | 0.891000 |
| 2 | 0.08 | 0.01 | 0.99028 |
| 3 | 0.05 | 0.01 | 0.99942 |
| 4 | 0.01 | 0.01 | 0.99999 |

As AP is a function of DMP and CP, the access probability AP may be determined using the number of attempts reported by the user equipment's 115. Since CP may be determined using the method described above, then DMP may be determined as well.

In yet other embodiments DMP is determinate over the dedicated preambles only, i.e., by only using dedicated preambles to determinate DMP. This is since there will be no contention among the dedicated preambles.

The determination of DMP may further be based on the particular attempt number, i.e., by utilizing the AP statistics for each attempt number wherein it is possible to derive DMP for each attempt number.

Further, the probability of not properly decoding the radio resource control connection request and radio resource control connection setup messages may be used in all above mentioned embodiments to further improve the determination of DMP.

According to some embodiments, the determining of access delay statistics is based on the calculated delay penalties which may comprise the following types as depicted in FIG. 5 and FIG. 6.

The first attempt delay penalty $\alpha_0$ 500, 600 is determined by taking the mean time between two random access opportunities.

The detection delay penalty $\alpha_1$ 501, 601 may be determined using a multitude of methods, e.g., By dividing the random response window by two, By measuring distribution of the random access response messages within the random access response window, Or by other knowledge regarding the core network, e.g., the load of the base station 110.

The detection miss delay penalty $\alpha_2$ 502, 602 may be determined by utilizing the length of the random access response window and the time between two random access opportunities. Further, in a case where a backoff parameter $T_B$ has been set by the base station 110, then this information may also be taken into account when determining $\alpha_2$. It may be assumed that an average backoff time will be the mean value of the uniform distribution between 0 and $T_B$.

The random access finished delay penalty $\alpha_3$ 503, 603 may be determined using a multitude of methods, By dividing the Contention Resolution window by two, By measured distribution of the radio resource control connection setup messages within the Contention Resolution window, Or by other knowledge regarding the core network, e.g., the load of the base station 110.

The contention resolution failed delay penalty $\alpha_4$ 504, 604 may be determined by utilizing the length of the contention resolution window and the time between two random access opportunities. Further, in case the back-off parameter $T_B$ has been set by the base station 110, then this information is also taken into account when determining $\alpha_2$. It may be assumed that the average back-off time will be the mean value of the uniform distribution between 0 and $T_B$.

Referring again to FIG. 4

Figure 4:
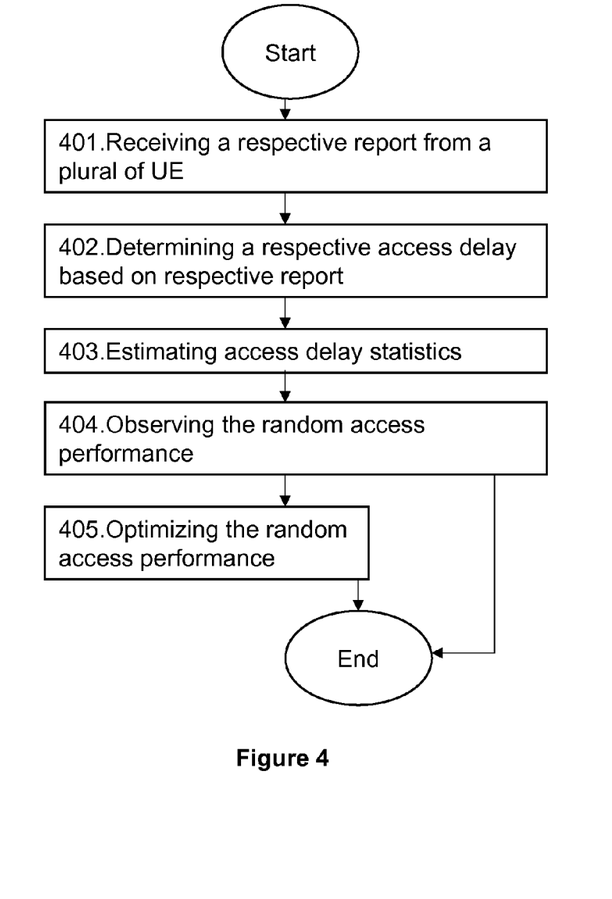
FIG. 4 is a flowchart depicting embodiments of a method,
FIG. 5 the outcome from a random access.

Step 403.

The base station 110 estimates access delay statistics based on the determined access delays. This may be performed in an access delay estimator which may use the access delays to derive access delay statistics.

Step 404

The base station 110 observes the random access performance based on the access delay statistics. The observed performance may be used to auto tune parameters in the base station 110. It may also be useful for operators to observe the performance activity.

Step 405

In some of the embodiments the method comprises to optimize the random access procedure based on the observed random access performance. The RACH optimization function, tunes a set of parameters, which impact access delay, in order to satisfy requirements on access delay. The observed performance may be used to tune the random access in long term evolution, e.g., by setting the configuration, or power control parameters. If the access delay is greater than what may be tolerated, then the base station 110 may choose to alter configuration or power control parameters in order to reduce the access delay to acceptable levels.

Figure 7:
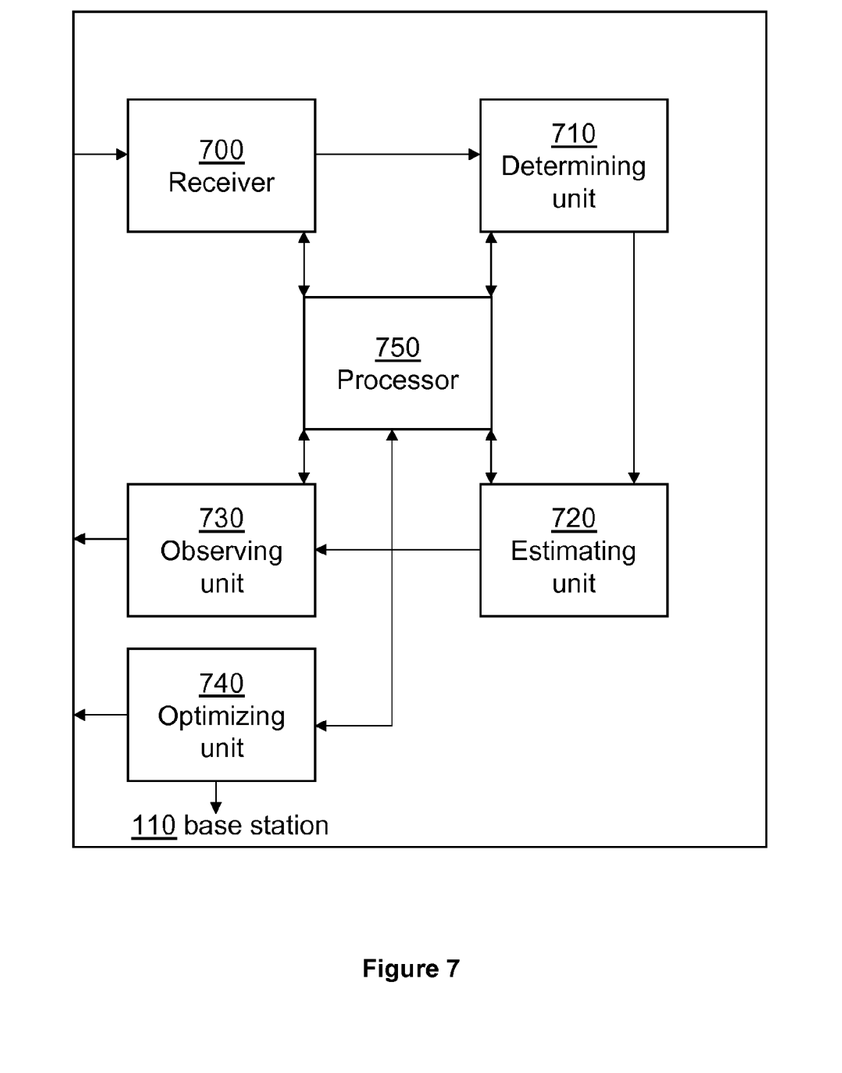
FIG. 7 is a schematic block diagram illustrating embodiments of a base station.

To perform the method steps referred to in FIG. 4 above for observing a random access performance, the base station 110 comprises an arrangement depicted in FIG. 7. As mentioned above, the random access performance is definable by an access delay: The access delay is a delay from the initial random access attempt until access is granted.

The base station 110 comprises a receiver 700 configured to receive a respective report from a plural of user equipments 115, where each of the respective user equipment 115 has been adapted to perform a random access process, and has been adapted to receive a random access grant. Each of the respective report, comprises access delay related random access information.

The base station 110 further comprises a determining unit 710 configured to determine a respective access delay based on each of the access delay related random access information.

In some embodiments of the base station 110, the determining unit 710 further is configured to determine the access delays related random access information of respective user equipment 115 comprises a number of transmitted preambles, observed contention resolution failures, and/or a margin for the user equipment 115 maximum output power level during random access.

In some embodiments of the base station 110 the determining unit 710 further is configured to determine the access delays based on a combination of;

a probability that a preamble sent by respective user equipment 115 is not detected by a base station 110, Detection Miss Probability, a probability that respective user equipment 115 are refused access because of contention, Contention Probability, and a calculation of delay penalties.

In some embodiments of the base station 110 the determining unit 710 further is configured to determine the access delays based on the Detection Miss Probability which is adapted to be determined by disregarding respective user equipment reports due to an indication that respective user equipment 115 has lost a contention resolution during the random access.

In some embodiments of the base station 110 the determining unit 710 further is configured to determine the access delays based on the Detection Miss Probability by determining an Access Probability by use of respective user equipment reports and thereby explicitly remove the impact of Contention Probability from said Access Probability.

In some embodiments of the base station 110 the determining unit 710 further is configured to determine the access delays based on the Detection Miss Probability by determining the Detection Miss Probability by only using the dedicated preambles.

In some embodiments of the base station 110 the determining unit 710 further is configured to determine the access delays based on the Detection Miss Probability by comprising a probability that a Radio Resource Control Connection Request and Radio Resource Control Connection Setup messages are not properly decoded.

In some embodiments of the base station 110 the determining unit 710 further is configured to determine the access delays based on the calculated delay penalties which comprises any of the following types:
  a first attempt delay,
  a detection delay,
  a detection miss delay,
  a random access finished delay, and
  a contention resolution failed delay.

In some embodiments of the base station 110 the determining unit 710 further is configured to determine the access delays based on the determining of the delay penalties which comprise a utilized knowledge with respect to any of;
  a Random Access Response window,
  a Contention Resolution window,
  a time between two random access opportunities, and other knowledge with respect to the core network, e.g. load on a base station 110.

The base station 110 further comprises a estimating unit 720 configured to estimate access delay statistics based on the determined access delays.

The base station 110 further comprises an observing unit 730 configured to observe the random access performance based on the access delay statistics.

According to some embodiments, the base station 110 further comprises an optimizing unit 740 configured to optimize the random access procedure based on the observed random access performance.

The present mechanism for observing a random access performance may be implemented through one or more processors, such as a processor 750 in the base station 110 depicted in FIG. 7, together with computer program code for performing the functions of the present solution. The program code mentioned above may also be provided as a computer program product, for instance in the form of a data carrier carrying computer program code for performing the present solution when being loaded into the base station 110. One such carrier may be in the form of a CD ROM disc. It is however feasible with other data carriers such as a memory stick. The computer program code can furthermore be provided as pure program code on a server and downloaded to the base station 110.

When using the word "comprise" or "comprising" it shall be interpreted as non-limiting, i.e. meaning "consist at least of".

The present invention is not limited to the above described preferred embodiments. Various alternatives, modifications and equivalents may be used. Therefore, the above embodiments should not be taken as limiting the scope of the invention, which is defined by the appending claims.

The invention claimed is:

1. A method in a base station for observing a random access performance in a Long Term Evolution communication network, where said random access performance is defined by an access delay, said access delay being a delay from an initial random access attempt until access is granted, the method comprising:
  receiving, by the base station, from a plurality of user equipment, a respective report, wherein each of the respective user equipment has performed a random access process and has received a random access grant, and each respective report comprises access delay related random access information;
  determining, by the base station, a respective access delay based on each of the access delay related random access information,
    wherein the determining of the respective access delay is based on a combination of (i) a probability that a preamble sent by the respective user equipment is not detected by the base station, (ii) a probability that the respective user equipment is refused access because of contention, and (iii) a calculation of delay penalties, wherein the combination is a product of a first sub-combination and a second sub-combination:
    the first sub-combination being a sum of at least the first attempt delay, the detection delay, and the random access finished delay; and
    the second sub-combination being a sum of:
      a product of the detection miss delay and the probability that the preamble sent by the respective user equipment is not detected by the base station, and
      a product of the probability that the respective user equipment is refused access because of contention and a sum of the detection delay and the contention resolution failed delay, and
    wherein the delay penalties include at least one of a first attempt delay, a detection delay, a detection miss delay, a random access finished delay, and a contention resolution delay;
  estimating, by the base station, access delay statistics based on the determined access delays; and
  observing, by the base station, the random access performance based on the access delay statistics.

2. The method according to claim 1, further comprising, optimizing a random access procedure based on the observed random access performance.

3. The method according to claim 1, wherein the access delay related random access information of respective user equipment comprise one or more of:
  a number of transmitted preambles,
  observed contention resolution failures, and
  a margin for user equipment maximum output power level during random access.

4. The method according to claim 1, wherein said determining of the respective access delay is based on said Detection Miss Probability which is determined by disregarding respective user equipment reports due to an indication that respective user equipment has lost a contention resolution during random access.

5. The method according to claim 1, wherein said determining of the respective access delay is based on said Detection Miss Probability by determining an Access Probability by use of respective user equipment reports and thereby explicitly remove the impact of Contention Probability from said Access Probability.

6. The method according to claim 1, wherein said determining of the respective access delay is based on said Detection Miss Probability by determining said Detection Miss Probability by only using dedicated preambles.

7. The method according to claim 1, wherein said determining of the respective access delay is based on said Detection Miss Probability which is determined by further comprising a probability that a Radio Resource Control Connection Request and Radio Resource Control Connection Setup messages are not properly decoded.

8. The method according to claim 1, wherein said determining of the respective access delay is based on the determination of said delay penalties which comprise a utilized knowledge with respect to any of:
a Random Access Response window,
a Contention Resolution window,
a time between two random access opportunities, and
core network information.

9. The method of claim 1, wherein the detection delay is determined by measuring distribution of random access response messages within a random access response window.

10. The method of claim 1, wherein a detection miss delay is determined by utilizing a length of a random access response window and a time between two random access opportunities.

11. The method of claim 1, wherein the respective access delay is based on access probability, wherein the access probability is:

$$1-\Pi*(\text{detection miss probability})+(1-\text{detection miss probability})*(\text{contention probability}).$$

12. The method of claim 1, wherein the combination includes a plurality of sub-combinations, each sub-combination including at least one of an addition and a multiplication of one or more of the probability that the preamble sent by the respective user equipment is not detected by the base station, the probability that the respective user equipment is refused access because of contention, and the delay penalties.

13. A base station for observing a random access performance in a Long Term Evolution communication network,
where said random access performance is definable by an access delay, said access delay being a delay from an initial random access attempt until access is granted, the base station comprising:
a receiver configured to receive, from a plurality of user equipment, a respective report, wherein each of the respective user equipment has been adapted to perform a random access process and has been adapted to receive a random access grant, and which respective report comprises access delay related random access information;
a memory; and
a processor coupled to the memory, the processor utilizing:
a determining unit to determine a respective access delay based on each of the access delay related random access information,
wherein the determination of the respective access delay is based on a combination of (i) a probability that a preamble sent by the respective user equipment is not detected by the base station, (ii) a probability that the respective user equipment is refused access because of contention, and (iii) a calculation of delay penalties, wherein the combination is a product of a first sub-combination and a second sub-combination:
the first sub-combination being a sum of at least the first attempt delay, the detection delay, and the random access finished delay; and
the second sub-combination being a sum of:
a product of the detection miss delay and the probability that the preamble sent by the respective user equipment is not detected by the base station, and
a product of the probability that the respective user equipment is refused access because of contention and a sum of the detection delay and the contention resolution failed delay; and
wherein the delay penalties include at least one of a first attempt delay, a detection delay, a detection miss delay, a random access finished delay, and a contention resolution failed delay,
an estimating unit to estimate access delay statistics based on the determined access delays, and
an observing unit to observe the random access performance based on the access delay statistics.

14. The base station according to claim 13, wherein the processor is further configured to utilize an optimizing unit to optimize a random access procedure based on the observed random access performance.

15. The base station according to claim 13, wherein the access delay related random access information of respective user equipment is adapted to comprise one or more of:
a number of transmitted preambles,
observed contention resolution failures, and
a margin for user equipment maximum output power level during random access.

16. The base station according to claim 13, wherein the processor is further configured to utilize the determining unit to determine the respective access delay based on said Detection Miss Probability which is adapted to be determined by disregarding respective user equipment reports due to an indication that respective user equipment has lost a contention resolution during random access.

17. The base station according to claim 13, wherein the processor is further configured to utilize the determining unit to determine the respective access delay based on said Detection Miss Probability by determining an Access Probability by use of respective user equipment reports and thereby explicitly remove the impact of Contention Probability from said Access Probability.

18. The base station according to claim 13, wherein the processor is further configured to utilize the determining unit to determine the respective access delay based on said Detection Miss Probability by determining said Detection Miss Probability by only using dedicated preambles.

19. The base station according to claim 13, wherein the processor is further configured to utilize the determining unit to determine the respective access delay based on said Detection Miss Probability which is determined by further comprising a probability that a Radio Resource Control Connection Request and Radio Resource Control Connection Setup messages are not properly decoded.

20. The base station according to claim 13, wherein the processor is further configured to utilize the determining unit to determine the respective access delay based on the determining of said delay penalties which comprise a utilized knowledge with respect to any of:
a Random Access Response window,
a Contention Resolution window,
a time between two random access opportunities, and
core network information.

21. The base station of claim 13, wherein the combination includes a plurality of sub-combinations, each sub-combination including at least one of an addition and multiplication of one or more of the probability that the preamble sent by the respective user equipment is not detected by the base station, the probability that the respective user equipment is refused access because of contention, and the delay penalties.

* * * * *